(12) United States Patent
Kaku

(10) Patent No.: US 9,973,413 B2
(45) Date of Patent: May 15, 2018

(54) RELAYING APPARATUS

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 15/138,361

(22) Filed: Apr. 26, 2016

(65) Prior Publication Data

US 2016/0359731 A1 Dec. 8, 2016

(30) Foreign Application Priority Data

Jun. 5, 2015 (JP) .................................. 2015-114902

(51) Int. Cl.
*H04L 12/24* (2006.01)
*H04L 12/705* (2013.01)
*H04L 12/751* (2013.01)
*H04L 12/741* (2013.01)

(52) U.S. Cl.
CPC .......... *H04L 45/18* (2013.01); *H04L 41/0631* (2013.01); *H04L 45/02* (2013.01); *H04L 45/745* (2013.01)

(58) Field of Classification Search
CPC ..... H04L 41/0631; H04L 45/02; H04L 45/18; H04L 45/745
See application file for complete search history.

(56) References Cited

U.S. PATENT DOCUMENTS

2005/0190747 A1\* 9/2005 Sindhwani ............ H04W 88/06 370/352
2008/0050117 A1\* 2/2008 Koley ................. H04J 14/0227 398/49
2008/0219168 A1\* 9/2008 Enomoto ................ H04L 45/04 370/237
2009/0232139 A1\* 9/2009 Kelley ................ H04L 12/4641 370/392
2010/0195660 A1\* 8/2010 Jiang ..................... H04L 12/437 370/400
2012/0008491 A1\* 1/2012 Shimada ............. H04L 12/4633 370/218
2012/0317230 A1\* 12/2012 Shirakawa .............. H04L 45/42 709/217
2014/0215491 A1\* 7/2014 Addepalli ............. H04W 4/046 719/313

FOREIGN PATENT DOCUMENTS

JP 2011-004048 A 1/2011

\* cited by examiner

*Primary Examiner* — Edan Orgad
*Assistant Examiner* — Nourali Mansoury
(74) *Attorney, Agent, or Firm* — Posz Law Group, PLC

(57) ABSTRACT

A relaying apparatus in a communication network has ports and a memory storing an address table where addresses of apparatuses connected to the respective ports are registered. The ports include a first and second particular ports to be connected in the communication network permitting a broadcast frame having been transmitted via the first particular port to be received via the second particular port. Upon receiving the broadcast frame via the second particular port, the relaying apparatus makes a determination whether or not a transmission-source address of the received broadcast frame is registered to a port other than the first and second particular ports in the address table. The relaying apparatus cancels the received broadcast frame when making the determination affirmatively.

3 Claims, 2 Drawing Sheets

RELAYING APPARATUS

CROSS REFERENCE TO RELATED APPLICATION

The present application is based on Japanese Patent Application No. 2015-114902 filed on Jun. 5, 2015 the disclosure of which is incorporated herein by reference.

TECHNICAL FIELD

The present disclosure relates to a relaying apparatus included in a communication network.

BACKGROUND ART

Patent Literature 1: JP 2011-004048 A

There is known a network of Ethernet (registered trademark), which connects Ethernet switches serving as relaying apparatuses in a loop circuit in order to enhance backup redundancy of the communication path. Each Ethernet switch has several ports, which include particular ports that are connected in the loop circuit. In a subject Ethernet switch, a broadcast frame is transmitted from a first particular port, and the transmitted broadcast frame then returns to a second particular port of the subject Ethernet switch itself. The broadcast frame having returned is transferred so as to be again transmitted from the first port of the subject Ethernet switch. Such transfer is repeated infinitely, causing the broadcast frame to continue to circle or go round forever within the network. Such phenomenon which causes broadcast frames to continue to circle or go round is called a broadcast storm.

Techniques solving broadcast storms include STP (Spanning Tree Protocol) and RSTP (Rapid Spanning Tree Protocol) (refer to Patent Literature 1).

SUMMARY

Here, STP or RSTP needs a significant time to terminate circling the loop circuit. The present disclosure has an object to provide a relaying apparatus which can quickly avoid a broadcast frame from circling.

To achieve the above object, according to an example of the present disclosure, a relaying apparatus in a communication network is provided to include a plurality of ports and a memory storing an address table that indicates an association between (i) a subject port being any one of the plurality of ports and (ii) a registered address of connected apparatus that is at least one apparatus connected with the subject port, the registered address being registered to the subject port. The relaying apparatus receives a frame via one of the plurality of ports and determines a determined port serving as a transfer destination of the received frame among the plurality of ports based on the address table and a transmission-destination address included in the received frame, then transmitting the received frame via the determined port. When the received frame is a broadcast frame, the relaying apparatus transmits the broadcast frame via each of the plurality of ports other than the one of the plurality of ports via which the broadcast frame is received.

The plurality of ports include (i) at least two particular ports that are a first particular port and a second particular port, and (ii) at least one different port being the plurality of ports other than the particular ports. The first particular port and the second particular port are provided to be connected in the communication network such that a broadcast frame having been transmitted via the first particular port is to be received via the second particular port.

The relaying apparatus includes a determination section, and a cancellation section. The determination section makes either an affirmative determination or a negative determination upon receiving a subject broadcast frame via the second particular port, the determination being as to whether or not a transmission-source address included in the received subject broadcast frame corresponds to the registered address registered to the different port other than the particular ports, in the address table. The cancellation section cancels the received subject broadcast frame when the affirmative determination is made by the determination section. Thereby, the received subject broadcast frame is no longer transmitted from any one of the plurality of ports of the relaying apparatus.

Suppose a communication network having a plurality of the above relaying apparatuses such that a particular port of one relaying apparatus is connected to a particular port of another relaying apparatus to form a loop connection or loop circuit connecting the plurality of relaying apparatuses. Under such configuration, once a broadcast frame is transmitted via a particular port of a subject relaying apparatus, the broadcast frame returns to the subject relaying apparatus itself to be received by another particular port of the subject relaying apparatus after passing through any other relaying apparatuses other than the subject relaying apparatus.

Further, suppose that any one of the relaying apparatuses connected in a loop circuit receives a broadcast frame via a different port (also referred to as a usual port) different from any particular ports and then transmits the broadcast frame via one of the particular ports. The above relaying apparatus, which transmits the broadcast frame via the particular port first among the relaying apparatuses, is referred to as an origin relaying apparatus.

In the above, the broadcast frame transmitted from the origin relaying apparatus has a transmission-source address that is naturally an address of an apparatus that is a transmission source of the broadcast frame; thus, the transmission-source address included in the broadcast frame is the address of the apparatus serving as an address of a connected apparatus that is connected with the usual port of the origin relaying apparatus.

Now, a broadcast frame having being transmitted from a particular port of an origin relaying apparatus goes round the loop circuit of the communication path including a plurality of relaying apparatuses is received by another particular port of the origin relaying apparatus. In such state, the determination section of the origin relaying apparatus makes the determination affirmatively. That is, the determination section makes the affirmative determination that the transmission-source address included in the broadcast frame received via the particular port is registered to a usual port in the address table. Therefore, the broadcast frame having gone round the loop circuit of the communication path and returned to the origin relaying apparatus is canceled or discarded by the cancellation section; the broadcast frame is no longer to be transmitted.

Thus, a broadcast frame, which has undergone the first circuit of a loop circuit of a communication path including a plurality of relaying apparatuses, is cancelled and prevented from starting to undergo the second circuit of the loop circuit. The relaying apparatus according to the first example can thus avoid shortly a broadcast frame from repeatedly going round a loop circuit.

In contrast, a comparative example may be provided as the following technique. That is, each relaying apparatus is assigned with a unique or own address; an origin relaying apparatus transmits a broadcast frame attached with the own address of the origin relaying apparatus; and upon receiving the broadcast frame attached with the own address, the origin relaying apparatus determines that the broadcast frame has gone round a loop circuit of the communication path. Such technique however needs to assign an address to relaying apparatuses. In contrast, the first example of the present disclosure need not assign any address to relaying apparatuses.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following explains a communication network according to an embodiment of the present disclosure.

(Configuration of Embodiment)

Figure 1:
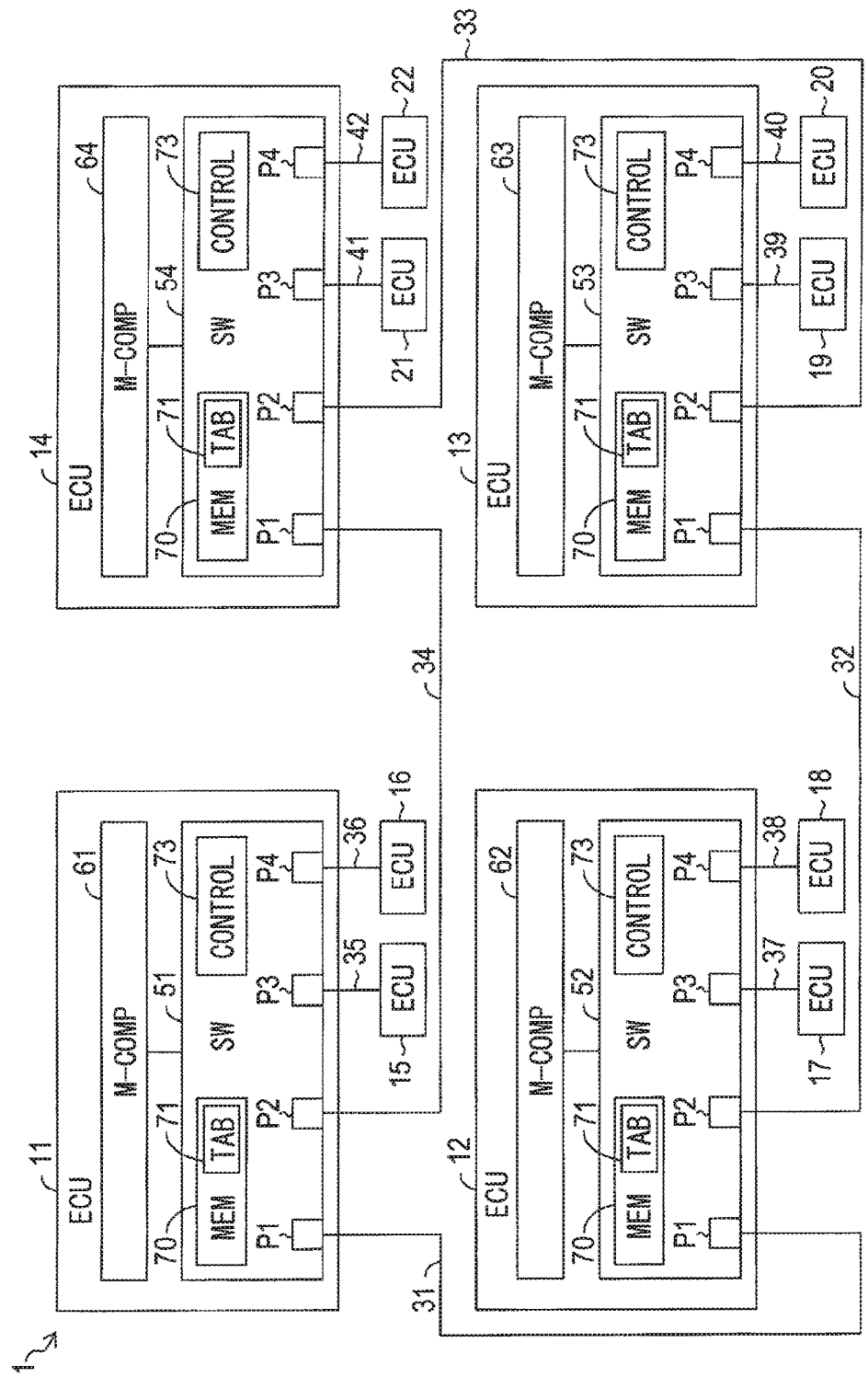
FIG. 1 is a diagram illustrating a configuration of a communication network according to an embodiment of the present disclosure.

FIG. 1 illustrates a communication network 1 according to the embodiment. For instance, the communication network 1 is an Ethernet network in an in-vehicle communication system mounted in a vehicle such as a passenger vehicle.

As in FIG. 1, the communication network 1 includes electronic control units (ECUs) 11-22 and communication lines 31-42. The ECUs 11-14, which serve as relaying apparatuses, relay the communication between other ECUs 15-22 while including respective Ethernet switches 51-54 (hereinafter referred to as switches) that are network switches in Ethernet. The ECUs 11-14 further include as arithmetic units respective microcomputers 61-64 each containing CPU, ROM, and RAM (none shown).

The switches 51-54, which are, e.g., layer 2 switches (L2 switches), perform the communication for relay compliant with an Ethernet standard. Each switch 51-54 includes (i) a plurality of ports P1-P4, e.g., four ports P1-P4 in the present embodiment, (ii) a MAC address table 71, and (iii) a communication controller 73 performing the communication processing for relay in compliance with the Ethernet standard. The MAC address table 71 is stored in a memory 70 serving as a storage unit. The communication controller 73 includes, e.g., an integrated circuit or a microcomputer. As an example, the following operations by each switch 51-54 are executed by the communication controller 73.

In the communication network 1, a port P1 of the switch 51 of the ECU 11 is connected with a port P1 of the switch 52 of the ECU 12 using the communication line 31; a port P2 of the switch 52 of the ECU 12 is connected with a port P1 of the switch 53 of the ECU 13 using the communication line 32. Further, a port P2 of the switch 53 of the ECU 13 is connected with a port P2 of the switch 54 of the ECU 14 using the communication line 33; a port P1 of the switch 54 of the ECU 14 is connected with a port P2 of the switch 51 of the ECU 11 using the communication line 34.

In addition, a port 3 and a port 4 of the switch 51 of the ECU 11 are connected with ECUs 15 and 16 using the communication lines 35 and 36, respectively. A port 3 and a port 4 of the switch 52 of the ECU 12 are connected with ECUs 17 and 18 using the communication lines 37 and 38, respectively. A port 3 and a port 4 of the switch 53 of the ECU 13 are connected with ECUs 19 and 20 using the communication lines 39 and 40, respectively. A port 3 and a port 4 of the switch 54 of the ECU 14 are connected with ECUs 21 and 22 using the communication lines 41 and 42, respectively.

That is, the switches 51-54 are connected to form a ring circuit (i.e., ring connection or ring topology) by connecting the ports P1 and P2 of one of the switches 51-54 to the ports P1 and P2 of another one of the switches 51-54. This ring circuit may be also referred to as a loop circuit (i.e., connection or topology). Further, among the ports P1-P4 of the switches 51-54, the other ports P3 and P4 unused for the ring connection are connected with the ECUs 15-22.

This configuration permits the communication path between the switches 51-54 to have two routes starting from an origin, e.g., from the switch 51. The first route is a left-handed or counterclockwise cycling route from the switch 51 to the switch 52; the second route is a right-handed or clockwise cycling route from the switch 51 to the switch 54. Such communication path having two routes provides a dual backup redundancy on the communication between any two ECUs 15-22 that are connected to mutually different ECUs 11-14 (i.e., mutually different switches 51-54). In the following, the ports P1 and P2 used for the ring connection of the switches 51-54 are referred to as ring ports or particular ports; the ports P3 and P4 not used for the ring connection are referred to as usual ports or different ports, which are different from the particular ports.

The MAC address table 71 in each switch 51-54 indicates an association between each port and a registered MAC address of at least one apparatus connected to each port; i.e., in the MAC address table 71, MAC addresses of apparatuses connected to the respective ports are registered with respect to the respective ports. The MAC address table 71 may be an example of an address table; the MAC Address registered in the MAC address table 71 may be an example of an address of a connected apparatus.

The MAC address table 71 is prepared by each switch 51-54 using a known MAC address learning function. That is, the switches 51-54 each receive a frame via a subject port that is any one of the ports P1-P4, and registers in the MAC address table (i) a port number of the subject port receiving the frame and (ii) the MAC address of the transmission source included in the frame, to be associated with each other, In other words, the MAC address of the transmission source is registered to the subject port having received the frame.

Note that the frame communicated in the communication network 1 is an Ethernet frame, which includes a MAC address of a transmission source and a MAC address of a transmission destination. The MAC address of the transmission source is equivalent to the MAC address of an apparatus serving as the transmission source and an example of an address of a transmission source or a transmission-source address. The MAC address of the transmission destination is equivalent to the MAC address of an apparatus serving as the transmission destination and an example of an address of a transmission destination or a transmission-destination address.

Each switch 51-54 has the following frame transfer function. That is, each switch 51-54 receives a frame via a subject port that is one of the ports P1-P4, and then determines a port serving as a transfer-destination port of the received frame among the ports P1-P4 based on the MAC address table 71 and a transmission-destination MAC address included in the received frame. In particular, each switch 51-54 searches the MAC address table 71 for the registered MAC address that is identical to or corresponding to the transmission-destination MAC address. When the corresponding MAC address is found out as being registered, a transfer-destination port is determined as a determined port to which the MAC address searched for is registered in the MAC address table 71. In contrast, when the corresponding MAC Address is not registered in the MAC address table 71, all the ports other than the subject port via which the frame is received are determined as transfer-destination ports also serving as determined ports. Each switch 51-54 then transmits the received frame via the port determined as the transfer-destination port. The frame transfer operation when the corresponding MAC address is registered in the MAC address table 71 is called filtering; the frame transfer operation when the corresponding MAC address is not registered is called flooding.

In addition, the frame includes a broadcast frame which is a frame for broadcasting; the broadcast frame contains as a transmission-destination MAC address a broadcast address that indicates a broadcast frame. This broadcast address is not registered in the MAC address table 71; thus, the received broadcast frame is transferred in flooding by each switch 51-54. That is, when receiving a broadcast frame via a subject port that is one of the ports P1-P4, each switch 51-54 transmits the received broadcast frame via each of the plurality of ports other than the subject port having received the broadcast frame.

Thus, the MAC address learning function and the frame transfer function of each of the switches 51-54 achieve the registration to the MAC address table 71 of MAC addresses of apparatuses connected with the respective ports P1-P4.

Figure 2:
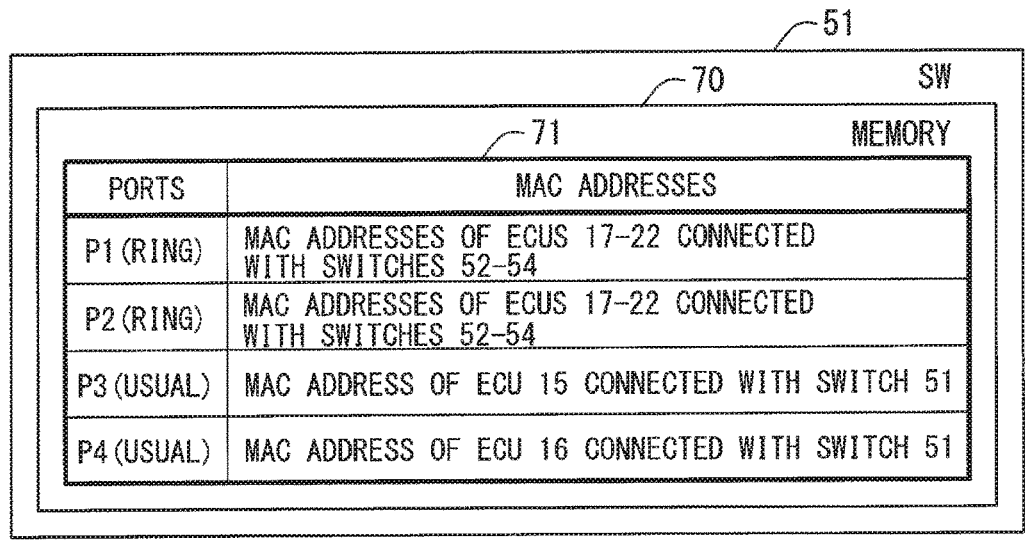
FIG. 2 is a diagram for explaining a MAC address table.

FIG. 2 illustrates, e.g., the MAC address table 71 of the switch 51, where the MAC address of the ECU 15 is registered to the port P3 and the MAC address of the ECU 16 is registered to the port P4. In addition, the MAC Addresses of the ECUs 17-22 connected to the ports P3 and P4 of other switches 52-54 other than the switch 51 are registered to each of the port P1 and the port P2. This is because the ECUs 17-22 are connected with the ports P1 and P2 of the switch 51 via the other switches 52-54.

Suppose that a broadcast frame is transmitted via either the port P1 or the port P2 of a subject switch that is one of the switches 51-54 in the communication network 1. Here, the broadcast frame having been transmitted via the port P1 of the subject switch is received via the port P2 of the subject switch itself via the other switches other than the subject switch. In contrast, the broadcast frame having been transmitted via the port P2 of the subject switch is received via the port P1 of the subject switch itself via the other switches other than the subject switch. That is, the ports P1 and P2 of each switch 51-54 are connected in the communication network such that a broadcast frame that is transmitted by a transmitting port that is one of the port P1 and the port P2 of each switch 51-54 is to be received by a receiving port that is the other one of the port P1 and the port P2.

Suppose the ECU 15 connected to the port P3 of the switch 51 transmits a broadcast frame, which contains a MAC address of the ECU 15 as a transmission-source MAC address.

Here, the switch 51 receives the broadcast frame via the port P3 and transmits the received broadcast frame via other ports P1, P2, and P4. The broadcast frame transmitted via the port P1 of the switch 51 is passed through other switches 52-54 (i.e., goes round one circuit of the loop circuit of the communication path including the switches 51-54), and is received via the port P2 of the switch 51. Similarly, the broadcast frame having been transmitted via the port P2 of the switch 51 is received via the port P1 of the switch 51 itself via the other switches 52-54.

Suppose that the switch 51 operates nothing in the above case. The broadcast frame having returned to the switch 51 is again transmitted from the port P1 or the port P2 of the switch 51, causing the broadcast frame to continue to go round or cycle within the communication network 1 for all time.

(Operations or Processes of Embodiment)

Figure 3:
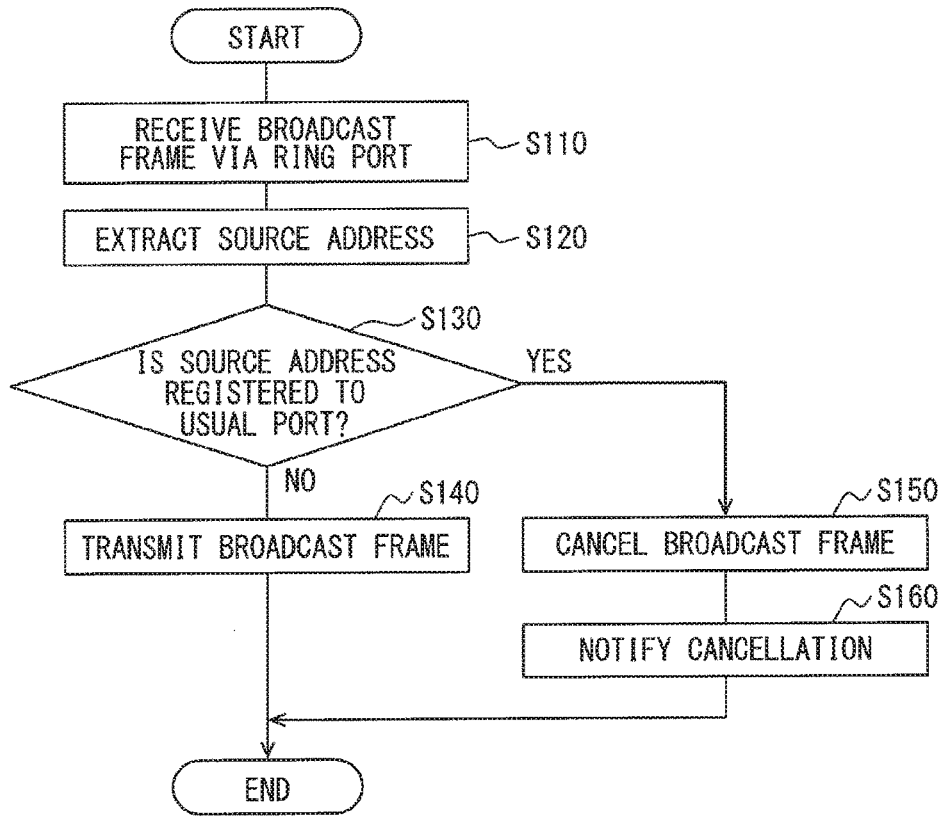
FIG. 3 is a flowchart diagram illustrating a loop-circling avoidance process.

The present embodiment provides a loop-cycling avoidance process in the communication controller 73 or each of the switches 51-54, as indicated with a flowchart in FIG. 3. Note that although the following process is explained with respect to the switch 51 as one example, processes with respect to other switches 52-53 are comparable.

It is further noted that a flowchart or processing of the process in the present embodiment includes sections (also referred to as steps), which are represented, for instance, as S110. Further, each section can be divided into several sections while several sections can be combined into a single section. Furthermore, each section can be referred to as a module, device, or a specific name, such as a determination module, a determination device, or a determiner, and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

As in FIG. 3, the switch 51 receives a broadcast frame via a subject ring port that is either the ring port P1 or ring port P2 (S110). A transmission-source MAC address, which is a MAC address of a transmission source, is extracted from the received broadcast frame (S120).

The switch 51 makes a determination affirmatively or negatively, the determination being as to whether or not the transmission-source MAC address in the broadcast frame is registered to the usual port P3 or the usual port P4 in the MAC address table 71 of the switch 51 itself (S130). This operation at S130 by the communication controller 73 may be referred to as a determination section, a determination device, a determination module, or a determiner.

The switch 51 transmits the received broadcast frame when the determination at S130 is negatively made (S140). That is, the switch 51 transmits the received broadcast frame via all the ports other than the subject ring port having received the broadcast frame.

In contrast, when the determination at S130 is affirmatively made, the switch 51 determines that the received broadcast frame returns after having gone round the loop circuit of the communication path one time, thereby canceling (i.e., discarding) the broadcast frame so as not to transmit again (S150). This operation at S150 by the communication controller 73 may be referred to as a cancellation section, a cancellation device, a cancellation module, or a canceller. Furthermore, the switch 51 notifies, e.g., the microcomputer 61 of the ECU 11 of a message indicating that the broadcast frame is canceled (S160). This operation at S160 by the communication controller 73 may be referred to as a notification section, a notification device, a notification module, or a notifier.

This is also exemplified as follows. First, a broadcast frame is transmitted by either the ECU 15 or the ECU 16 to the switch 51. Second, the broadcast frame is transmitted via each of the ports P1 and P2 of the switch 51. Third, the broadcast frame goes round the loop circuit of the communication path one time using two routes. Fourth, finally, the broadcast frame returns to each of the ports P1 and P2 of the switch 51. Such case leads to the affirmative determination at S130 of the switch 51, resulting in cancellation of the broadcast frame by the switch 51.

Another example is indicated with reference to the MAC address table 71 of the switch 51 in FIG. 2. The ports P1 and P2 are not assigned (i.e., not registered) with the MAC addresses of the ECUs 15 and 16, which are respectively connected to the ports P3 and P4 of the switch 51. This is because when receiving via the ports P1 and P2 a broadcast frame that have been transmitted from the ECUs 15 and 16, the switch 51 cancels the received broadcast frame and thereby does not use the received broadcast frame for preparing (i.e., updating) the MAC address table 71.

(Advantageous Effects)

The switches 51-54 of the present embodiment detect certainly a broadcast frame having gone round a loop circuit of the communication path one time, preventing the broadcast frame from going round the loop circuit again (i.e., twice). The broadcast frame is prevented shortly from repeatedly going round the loop circuit.

In addition, addresses of apparatuses may include any identification information other than MAC addresses. In contrast, the present embodiment employing MAC addresses may be favorably applied to an Ethernet easily. In addition, as compared with the comparative example, the present embodiment does not require the switches 51-54 to have own addresses purposely. In particular, L2 switches, which do not have any MAC address typically, may be applied to the present embodiment.

Furthermore, the switches 51-54 notify the microcomputers 61-64 of the ECUs 11-14, respectively, that the broadcast frame is canceled when cancelling the broadcast frame having gone round the loop circuit one time (S160). This notification by the switches 51-54 permits the respective microcomputers 61-64 to confirm the presence of a loop circuit of the communication path, i.e., the presence of a redundant communication path. Note that the notification by the switch 51 at S160 may be directed to any microcomputer 62-64 of other ECUs 12-14 other than the ECU 11 having the switch 51.

(Other Embodiments)

Although the embodiment is described above, the present disclosure is not limited to the embodiment and can be modified in various manners. The number of ECUs, switches, or ports may be variable without need to be limited to the numbers indicated in the above embodiment, which are indicated as just examples.

The above embodiment employs a ring connection or ring topology as a network topology of the switches 51-54. Without need to be limited thereto, a network topology may use any one such as a mesh topology, a full contact topology, as long as forming a loop circuit.

Further, among the ports of each switch 51-54, particular ports are defined as the ports that are used to form a loop connection by connecting the switches 51-54, one of the particular ports transmitting a broadcast frame, another one of the particular ports receiving the broadcast frame. Such particular ports may not be limited to the port P1 and the port P2 only; namely, the number of particular ports may be three or more without need to be limited to two in the above embodiment. For example, a full contact topology as a network topology requires each of four switches 51-54 to have three particular ports.

In addition, the present disclosure may be also directed to not only the above-mentioned switch serving as a relay apparatus, but also a communication network including the switches, a computer-implemented relay controlling method permitting a computer to function as the switch, a program product stored in a non-transitory computer-readable media including instructions achieving the method, and/or the media.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A relaying apparatus in a communication network, including a plurality of ports and a memory storing an address table that indicates an association between (i) a subject port being any one of the plurality of ports and (ii) a registered address of connected apparatus that is at least one apparatus connected with the subject port, the registered address being registered to the subject port, the relaying apparatus receiving a frame via one of the plurality of ports, the relaying apparatus determining a determined port serving as a transfer destination of the received frame among the plurality of ports based on the address table and a transmission-destination address included in the received frame, then transmitting the received frame via the determined port, the relaying apparatus further transmitting, when the received frame is a broadcast frame, the broadcast frame via each of the plurality of ports other than the one of the plurality of ports via which the broadcast frame is received, wherein:

the plurality of ports include (i) at least two particular ports that are a first particular port and a second particular port, and (ii) at least one different port being the plurality of ports other than the particular ports; and the first particular port and the second particular port are provided to be connected in the communication network such that a broadcast frame having been transmitted via the first particular port is to be received via the second particular port, the relaying apparatus comprising:

a determination section that makes a determination affirmatively or negatively upon receiving a subject broadcast frame via the second particular port, the determination being as to whether or not a transmission-source address included in the received subject broadcast frame corresponds to the registered address, which is registered to the different port other than the particular ports, in the address table; and a cancellation section that cancels the received subject broadcast frame when the determination section makes the determination affirmatively.

2. The relaying apparatus according to claim 1, wherein the registered address registered in the address table, and the transmission-destination address and the transmission-source address each are provided as MAC addresses.

3. The relaying apparatus according to claim 1, further comprising:
a notification section that notifies, when the subject broadcast frame is cancelled by the cancellation section, an arithmetic unit that the subject broadcast frame is canceled.

\* \* \* \* \*